United States Patent
Deng et al.

(10) Patent No.: US 11,415,552 B2
(45) Date of Patent: Aug. 16, 2022

(54) IN OPERANDO, NON-INVASIVE STATE-OF-CHARGE MONITORING FOR REDOX FLOW BATTERIES

(71) Applicant: Battelle Memorial Institute, Richland, WA (US)

(72) Inventors: Zhiqun Deng, Richland, WA (US); Wei Wang, Kennewick, WA (US); Xiaoqin Zang, Richland, WA (US); Litao Yan, Richland, WA (US); Yang Yang, Richland, WA (US); Huilin Pan, Hangzhou (CN); Zimin Nie, Richland, WA (US); Jun Lu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 277 days.

(21) Appl. No.: 16/893,953

(22) Filed: Jun. 5, 2020

(65) Prior Publication Data
US 2020/0400614 A1  Dec. 24, 2020

Related U.S. Application Data

(60) Provisional application No. 62/863,686, filed on Jun. 19, 2019.

(51) Int. Cl.
*G01N 29/032* (2006.01)
*G01N 29/30* (2006.01)
(Continued)

(52) U.S. Cl.
CPC .......... *G01N 29/032* (2013.01); *G01N 29/30* (2013.01); *H01M 8/04611* (2013.01);
(Continued)

(58) Field of Classification Search
CPC .... G01N 29/032; G01N 29/30; G01N 29/343; G01N 29/348; G01N 2291/015;
(Continued)

(56) References Cited

U.S. PATENT DOCUMENTS

2019/0072614 A1* 3/2019 Steingart ................ G06N 20/00

OTHER PUBLICATIONS

"Measurement and Characterization of Particles by Acoustic Methods", Part 1: Concepts and Procedures in Ultrasonic Attenuation Spectroscopy, Aug. 1, 2006, 28 pages.
(Continued)

*Primary Examiner* — Randy W Gibson
*Assistant Examiner* — John M Royston
(74) *Attorney, Agent, or Firm* — Colby Nipper PLLC

(57) ABSTRACT

This document describes techniques and systems for in operando, non-invasive SOC monitoring of redox flow batteries. The described techniques and systems allow for accurate, inexpensive, portable, and real-time methods to measure the SOC of redox flow batteries. System operators can monitor the SOC by measuring an acoustic attenuation coefficient of the electrolyte in the redox flow battery. The acoustic attenuation coefficient is measured using an ultrasonic transducer attached to a probing cell, which is connected to an electrolyte flow of a redox flow battery. The acoustic attenuation coefficient provides an accurate, real-time SOC measurement that is generally insensitive to varying operational temperatures of the electrolyte solution.

25 Claims, 5 Drawing Sheets

(51) Int. Cl.
    *H01M 8/04537* (2016.01)
    *H01M 8/18* (2006.01)
    *G01N 29/34* (2006.01)

(52) U.S. Cl.
    CPC .......... *H01M 8/188* (2013.01); *G01N 29/343* (2013.01); *G01N 29/348* (2013.01); *G01N 2291/015* (2013.01); *G01N 2291/0228* (2013.01); *G01N 2291/044* (2013.01); *G01N 2291/101* (2013.01); *G01N 2291/2697* (2013.01); *H01M 8/04604* (2013.01); *Y02E 60/50* (2013.01)

(58) Field of Classification Search
    CPC ..... G01N 2291/0228; G01N 2291/044; G01N 2291/101; G01N 2291/2697; H01M 8/04611; H01M 8/188; H01M 8/0444; H01M 8/04604; Y02E 60/50
    See application file for complete search history.

(56) References Cited

OTHER PUBLICATIONS

Chou, et al., "A Novel Ultrasonic Velocity Sensing Approach to Monitoring State of Charge of Vanadium Redox Flow Battery", Applied Energy 182; Elsevier, Mar. 11, 2016, 7 pages.

Gold, et al., "Probing Lithium-ion Batteries' State-of-Charge Using Ultrasonic Transmission—Concept and Laboratory Testing", Journal of Power Sources 343; Elsevier, Oct. 21, 2016, 9 pages.

Hsieh, et al., "Electrochemical-acoustic Time of Flight: in Operando Correlation of Physical Dynamics with Battery Charge and Health", Energy & Environmental Science; Royal Society of Chemistry, Jan. 13, 2015, 9 pages.

Zang, et al., "Monitoring the State-of-Charge of a Vanadium Redox Flow Battery with the Acoustic Attenuation Coefficient: An In Operando Noninvasive Method", Small Methods; www.small-methods.com; vol. 3, No. 12, Dec. 11, 2019, 10 pages.

* cited by examiner

IN OPERANDO, NON-INVASIVE STATE-OF-CHARGE MONITORING FOR REDOX FLOW BATTERIES

PRIORITY/CROSS-REFERENCE TO RELATED APPLICATIONS

This application claims priority to U.S. provisional application Ser. No. 62/863,686, which was filed on Jun. 19, 2019. The entire content of the provisional application is hereby incorporated by reference.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

BACKGROUND

Integration of energy generated by renewable and sustainable resources (e.g., solar, geothermal, and wind power) into the electricity transmission- and distribution-grid decreases greenhouse gas emissions and serves as a useful component in grid modernization. The intermittent and fluctuating nature of energy produced from renewable resources, however, threatens grid stability when the energy share from these resources surpasses twenty percent of overall energy production. As the amount of electricity supplied by renewable resources continues to increase, the need for effective energy storage technologies to manage the energy from these sources also increases. As a result, large-scale, stationary energy storage has become increasingly important in the energy market.

Because of their safety and design flexibility, chemical reduction and oxidation (redox) flow batteries have become an important and promising option for large-scale grid energy storage. To maintain optimal and economical battery operation, system operators must have access to high-fidelity and real-time information on the status of the electrolyte in redox flow batteries, including the state-of-charge (SOC). SOC is a critical indicator of battery health. Effective SOC monitoring provides accurate information to system operators and battery-management systems to prevent overcharging. System operators can also use SOC information to manage the electrolyte solution and maintain stable battery capacity.

Several electrochemical methods have been developed to monitor battery SOC. Such methods include open-circuit cell-voltage monitoring and spectroscopy. The open-circuit cell-voltage method is the most commonly-used approach. This method can convert a potential measurement to a SOC. The method, however, requires the electrolyte solution in the redox flow battery to be balanced to generate accurate SOC measurements. Electrolyte balance is usually lost in redox flow batteries due to the inevitable electrolyte crossover that occurs over extended operating periods. As a result, the open-circuit cell-voltage method is generally not sufficiently accurate for system operators to monitor redox flow batteries.

Spectroscopic approaches, including spectrophotometry and Raman spectroscopy, have also been developed to measure SOC in redox flow batteries. Although these methods are more accurate than open-circuit cell-voltage methods, they generally require a sample of the electrolyte to be extracted from the redox flow battery and analyzed off-site. As a result, spectroscopic methods are usually too expensive and impractical for online, in operando monitoring of the SOC of a redox flow battery.

SUMMARY

This document describes techniques and systems for in operando, non-invasive SOC monitoring of redox flow batteries. The described techniques and systems allow for accurate, inexpensive, portable, and real-time methods to measure the SOC of redox flow batteries. System operators can monitor the SOC by measuring an acoustic attenuation coefficient of the electrolyte in the redox flow battery. The acoustic attenuation coefficient is measured using an ultrasonic transducer attached to a probing cell, which is connected to an electrolyte flow of a redox flow battery. The acoustic attenuation coefficient provides an accurate, real-time SOC measurement that is generally insensitive to varying operational temperatures of the electrolyte solution.

In some aspects, this disclosure describes a system for monitoring the SOC of a redox flow battery. The redox flow battery can include an electrolyte reservoir containing an electrolyte solution. The system includes a probing cell and an ultrasonic system, which comprises an ultrasonic pulser-receiver and an ultrasonic transducer. The probing cell is connected to the electrolyte reservoir. The ultrasonic transducer is attached to the probing cell and configured to transmit pulses at a frequency into the probing cell. The transmitted pulses are reflected within the probing cell as echoes. The echoes are received by the ultrasonic transducer. The system further comprises one or more processors of a computer system, which are configured to process the echoes to obtain acoustic measurements. The acoustic measurements are effective to calculate an acoustic attenuation coefficient of the electrolyte solution. The acoustic attenuation coefficient represents an energy loss rate of the echoes after propagation through the probing cell. The one or more processors determine, based on the acoustic attenuation coefficient, the SOC of the redox flow battery.

This document also describes other configurations of, and methods for, in operando, non-invasive SOC monitoring for redox flow batteries, as well as computer systems and non-transitory computer-readable storage media to perform these methods.

This Summary is provided to introduce simplified concepts for in operando, non-invasive SOC monitoring for redox flow batteries, which is further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects for in operando, non-invasive SOC monitoring for redox flow batteries are described in this document with reference to the following drawings. The same numbers are used throughout multiple drawings to reference like features and components.

DETAILED DESCRIPTION

Overview

Figure 1:
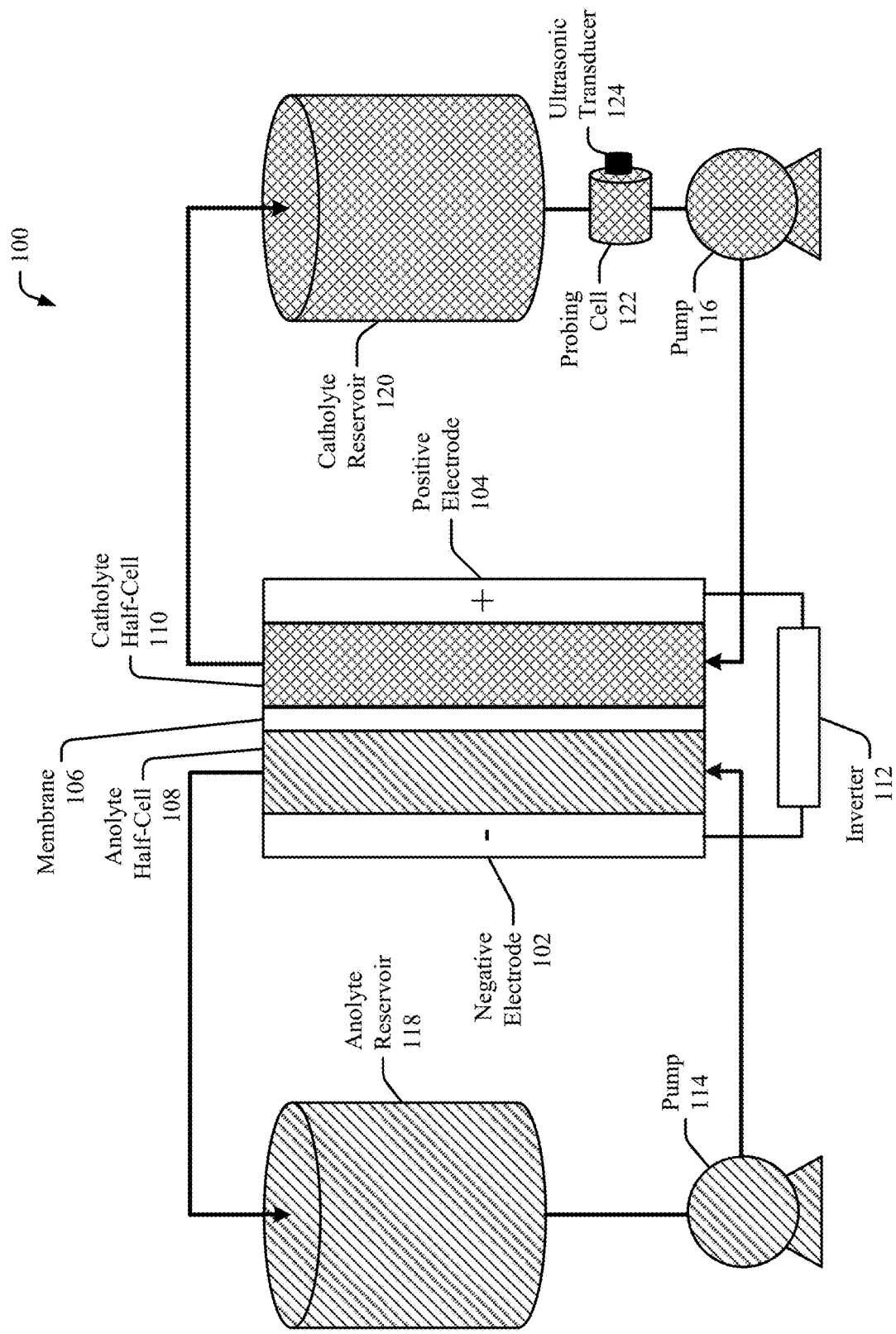
FIG. 1 is a schematic view illustrating an example redox flow battery in which in operando, non-invasive systems and techniques are used to monitor the SOC.

As discussed above, redox flow batteries are a promising option for large-scale grid energy storage. Access to accurate SOC measurements, however, is useful for maintaining optimal and economical battery operation.

Different types of redox flow batteries exist. As one example, vanadium redox flow batteries (VRFBs) provide significant benefits, including a long cycle life, modular design, and lower cost compared to different redox flow batteries. A major advantage of VRFBs is that cross-contamination resulting from electrolyte crossover through the separating membrane is reduced. Another advantage of VRFBs is that they can be fully discharged without damaging the battery. In contrast, the metal ion-intercalation electrode materials used in lithium- or sodium-ion batteries are damaged if the battery is fully discharged. Despite these advantages, air oxidation of vanadium, hydrogen evolution at the negative side, and differential transfer of vanadium ions can still result in capacity loss over the extended operation of the battery. As a result, system operators frequently manage the health status, including the SOC, of VRFBs to maintain a long cycle life and a high energy efficiency.

Engineers have developed several methods to monitor the SOC of VRFBs and other types of redox flow batteries. These methods include open-circuit cell-voltage monitoring and spectroscopic approaches. Although the open-circuit cell-voltage method is the most commonly-used approach, it has a critical limitation. It generally does not provide accurate SOC measurements for industrial applications. When the electrolyte of a redox flow battery is balanced, this method can convert potential measurements across the battery to SOC measurements. Electrolyte crossover, however, is inevitable in redox flow batteries with extended life cycles. As a result, the open-circuit cell-voltage method is generally not an accurate method to monitor the SOC of redox flow batteries in real-world applications.

Spectroscopic approaches, including ultraviolet-visible spectrum, optical absorbance, and Raman spectroscopy, have also been developed to measure SOC. Although these methods are generally more accurate, they are too expensive and impractical for in operando monitoring of SOC. In a spectroscopic approach, a system operator collects intermittent samples of an electrolyte solution from a redox flow battery and has the samples analyzed using special equipment. This equipment is expensive, stationary, and generally not available onsite for system operators. As a result, system operators are not able to obtain real-time, cost-efficient measurements of the SOC for a redox flow battery.

In contrast, the described ultrasonic systems and techniques provide an opportunity for system operators to perform in operando, non-invasive SOC measurements of a redox flow battery. Ultrasonic probing is a nondestructive technique used in other industries to detect flaws in materials. In ultrasonic systems, an ultrasonic transducer emits ultrasonic pulses into a medium-of-interest. The pulses are reflected as echoes when they encounter an interface with a mismatched acoustic impedance. The time-of-flight and the amplitude of the echoes can be analyzed to characterize properties of the medium through which the echoes propagated. The process of transmitting pulses into a medium and analyzing the echoes is often referred to as a pulse-echo method.

In this description, techniques and systems are described that utilize a pulse-echo method to monitor the SOC of a redox flow battery based on acoustic properties (e.g., an acoustic attenuation coefficient) of the electrolyte. As a redox flow battery proceeds through charge and discharge cycles, the electrolyte composition changes. The SOC of the redox flow battery, which is defined as the percentage of the reaction product in the total redox ions, also changes. The varying ratios of ions in the electrolyte solution change the specific gravity and viscosity of the electrolyte. A measured acoustic attenuation coefficient of the electrolyte solution tracks these changes. Accordingly, the described systems and techniques provide in operando, non-invasive SOC monitoring for redox flow batteries.

For example, in aspects, the described systems and techniques use a probing cell to measure the acoustic attenuation coefficient of electrolytes in redox flow batteries. System operators can use these systems and techniques for in operando monitoring without extracting samples for ex-situ analysis. In addition, the described systems and techniques cost less than spectrophotometric methods, making them attractive for commercial applications.

The following description and the referenced drawings provide illustrative examples of in operando, non-invasive SOC monitoring for redox flow batteries. As such, the discussed embodiments are merely exemplary and not intended to limit the scope of the invention, or its protection, in any manner Rather, the description and illustration of these embodiments serve to enable a person of ordinary skill in the relevant art to practice the invention.

The following description includes an example mode of a preferred embodiment of the present disclosure. The use of "e.g.," "etc.," "as an example," "for example," and "or," as well as other grammatically related terms, indicates non-exclusive alternatives without limitation unless the context clearly dictates otherwise. The use of "including," "such as," and other grammatically related terms means "including, but not limited to," unless the context clearly dictates otherwise. The use of the articles "a," "an," and "the" are meant to be interpreted as referring to the singular as well as the plural, unless the context clearly dictates otherwise. Words of approximation (e.g., "generally"), as used in the context of the specification and figures, are intended to take on their ordinary and customary meanings which denote approximation, unless the context clearly dictates otherwise.

Operating Environment

FIG. 1 illustrates an example redox flow battery 100 in which in operando, non-invasive systems and techniques are used to monitor the SOC. The redox flow battery 100 is an electrochemical energy storage device that can convert chemical energy into electrical energy through reversible oxidation and reduction of working fluids.

The redox flow battery 100 can be, for example, a VRFB. The described SOC monitoring can be used in other types of redox flow batteries, including a hybrid redox flow battery with gas supply at one electrode, a redox flow battery with a membrane-less structure, a proton flow battery with a metal hybrid storage electrode and a reversible proton exchange membrane, a nano-network flow battery, a semi-solid redox flow battery with solid particle suspension as flowing media, and the like. The chemical components of the electrolytes in the redox flow battery 100 can include various solutions. The electrolyte solution can include, for example, hydrogen-lithium bromate, hydrogen-lithium chlorate, bromine-hydrogen, iron-iron, iron-tin, iron-titanium, iron-chromium, vanadium-vanadium sulfate, vanadium-vanadium bromide, sodium-bromine polysulfide, sodium-potassium, sulfur-oxygen-salt, zinc-bromine, lead-acid (methanesulfonate), zinc-cerium (methanesulfonate), and zinc-iron.

The redox flow battery 100 includes a negative electrode 102, a positive electrode 104, a membrane 106, an anolyte half-cell 108, and a catholyte half-cell 110 in a sandwich-cell design. During a discharge cycle, reduction occurs at the catholyte half-cell 110 and oxidation occurs at the anolyte half-cell 108. The reduction and oxidation that occurs in a VRFB, as an example, is illustrated in Equations (1)-(3):

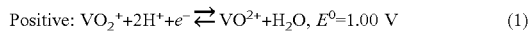

Positive: $VO_2^+ + 2H^+ + e^- \rightleftarrows VO^{2+} + H_2O$, $E^0 = 1.00$ V  (1)

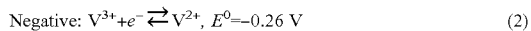

Negative: $V^{3+} + e^- \rightleftarrows V^{2+}$, $E^0 = -0.26$ V  (2)

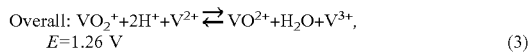

Overall: $VO_2^+ + 2H^+ + V^{2+} \rightleftarrows VO^{2+} + H_2O + V^{3+}$, $E = 1.26$ V  (3)

Similarly, during a charge cycle, reduction occurs at the anolyte half-cell 108, and oxidation occurs at the catholyte half-cell 110. While these redox reactions occur, proton ions diffuse across the membrane 106, and electrons transfer through an inverter 112. The inverter 112 changes direct current (DC) supplied by the redox flow battery 100 to alternating current (AC). The inverter 112 can be electronic, mechanical, or a combination thereof. The standard cell voltage of the redox flow battery 100 can be 1.26 V.

The negative electrode 102 and the positive electrode 104 can be porous carbon. The anolyte half-cell 108 and the catholyte half-cell 110 are held in between the negative electrode 102 and the positive electrode 104. The membrane 106 permits ions to pass through and separates the anolyte half-cell 108 from the catholyte half-cell 110. The membrane 106 can be an anion-cation exchange membrane, including a Nafion™ 115 membrane.

The redox flow battery 100 also includes pumps 114 and 116. The pump 114 circulates the anolyte electrolyte from an anolyte reservoir 118 to the anolyte half-cell 108 and past the membrane 106. Similarly, the pump 116 circulates the catholyte electrolyte from a catholyte reservoir 120 to the catholyte half-cell 110 and past the membrane 106.

Acoustic properties of the electrolyte solution in the redox flow battery 100 can be measured using an ultrasonic transducer 124. The ultrasonic transducer 124 can be a piezoelectric transducer or another type of device that generates ultrasonic pulses, including a magnetostriction transducer. In the depicted example, the ultrasonic transducer 124 is mounted to a probing cell 122. The probing cell 122 is included in the flow path of the catholyte electrolyte. In other implementations, the ultrasonic transducer 124 can be mounted to a wall of the catholyte reservoir 120.

The SOC of the redox flow battery 100 can be measured by analyzing the acoustic properties of the catholyte electrolyte. In other implementations, system operators can analyze the acoustic properties of the catholyte electrolyte or both electrolytes using the probing cell 122 to monitor the SOC of the redox flow battery 100. The design and operation of the probing cell 122 is described below with respect to FIG. 2.

Figure 2:
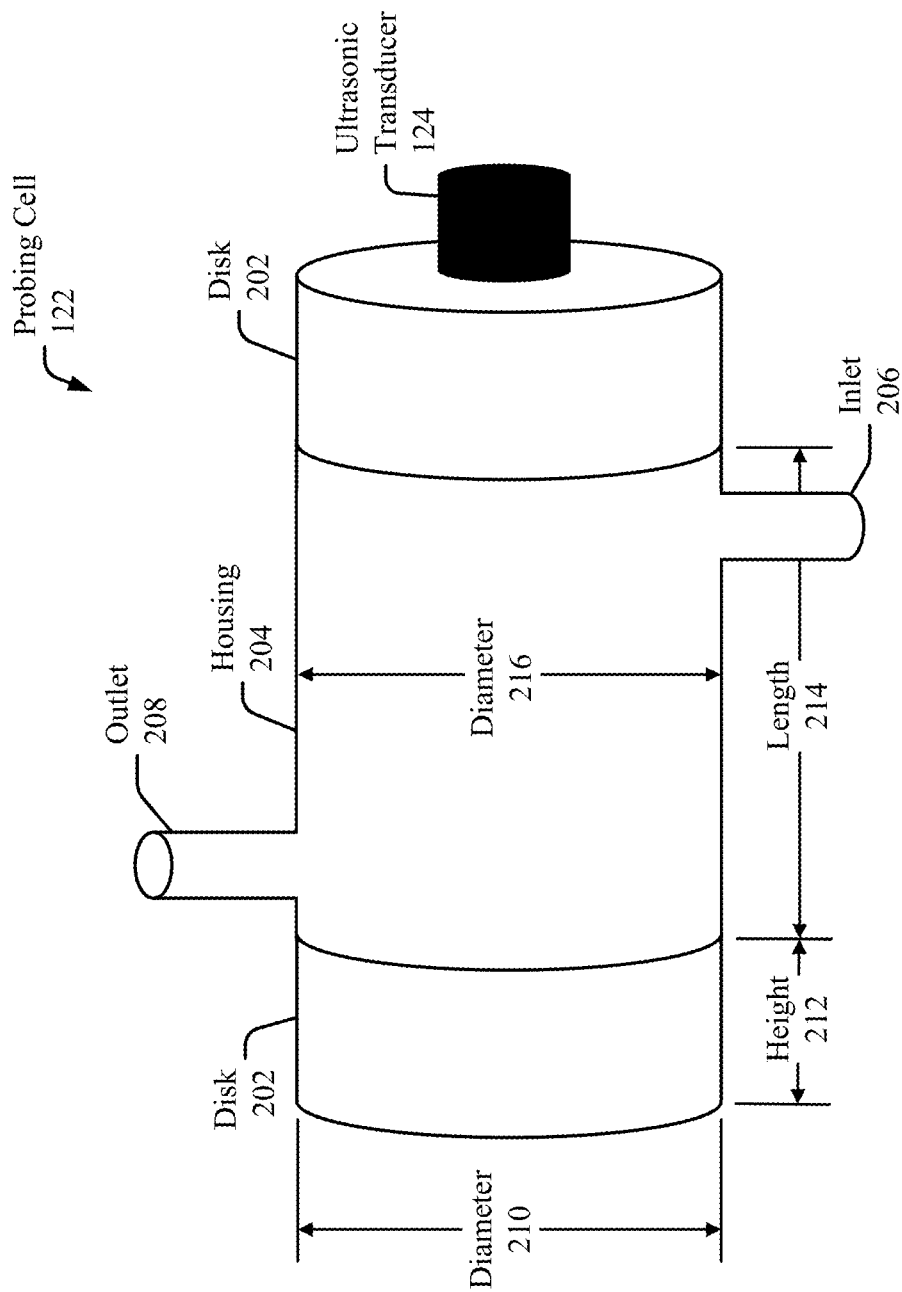
FIG. 2 is a schematic view illustrating an example probing cell of the described systems and techniques to monitor the SOC of a redox flow battery.

FIG. 2 illustrates an example probing cell 122 of the described systems and techniques to monitor the SOC of the redox flow battery 100. The probing cell 122 allows for in operando, non-invasive measuring of the acoustic attenuation coefficient of the catholyte solution in the redox flow battery 100. As discussed above, the probing cell 122 can be used to measure the acoustic attenuation coefficient of the catholyte solution or both the anolyte and catholyte solutions in the redox flow battery 100.

The probing cell 122 can be permanently integrated into the redox flow battery 100 (as depicted in FIG. 1). Alternatively, system operators can temporarily connect the probing cell 122 to the flow path of the catholyte solution of the redox flow battery 100. In this way, the described systems and techniques can be integrated into the redox flow battery 100 at any time without damaging or interrupting the operation of the redox flow battery 100.

The probing cell 122 includes disks 202, a housing 204, an inlet 206, and an outlet 208. In the depicted example, the housing 204 has a cylindrical shape and is made of borosilicate glass with a diameter 216. In aspects, the housing 204 may be a container, a flow-through container, or a main tube. Borosilicate glass is inert to the acidic catholyte solution, transparent, and relatively inexpensive. Other materials, including titanium, can be used for the housing 204. The housing 204 can also have a different shape, including spherical, parallelepipedal, or cubical.

The inlet 206 and the outlet 208 connect the probing cell 122 to the catholyte flow path of the redox flow battery 100. The inlet 206 and the outlet 208 can be designed for permanent or temporary integration into the catholyte flow path. The catholyte flow path can include valves to direct the catholyte solution to and from the inlet 206 and the outlet 208 of the probing cell 122, respectively. For example, the inlet 206 and the outlet 208 can utilize quick-connect plumbing fittings to allow integration.

The disks 202 may be positioned at each lateral end of the housing 204. In the depicted example, the disks 202 are made of borosilicate glass with a diameter 210. In other implementations, other materials, including titanium, can be used for the disks 202. The disks have a diameter 210, which can be approximately the same as the diameter 216 of the housing 204.

The disks 202 have a height 212 that is chosen, based on a frequency of the ultrasonic transducer 124, so that echoes reflected at the catholyte-disk interface are well separated. Similarly, a longitudinal length 214 of the housing 204, based on a frequency of the ultrasonic transducer 124, is chosen to separate echoes that propagate through the housing 204.

In the depicted example, the ultrasonic transducer 124 is attached to one of the disks 202. In aspects, the ultrasonic transducer 124 can be glued to the disk 202 using epoxy, which facilitates the transmission of sound energy between the ultrasonic transducer 124 and the disk 202 and attaches the ultrasonic transducer 124 in place to maintain consistent measurements. In other aspects, the ultrasonic transducer 124 can be removably attached to the disk 202 using a fastener (e.g., a clamp).

Figure 3:
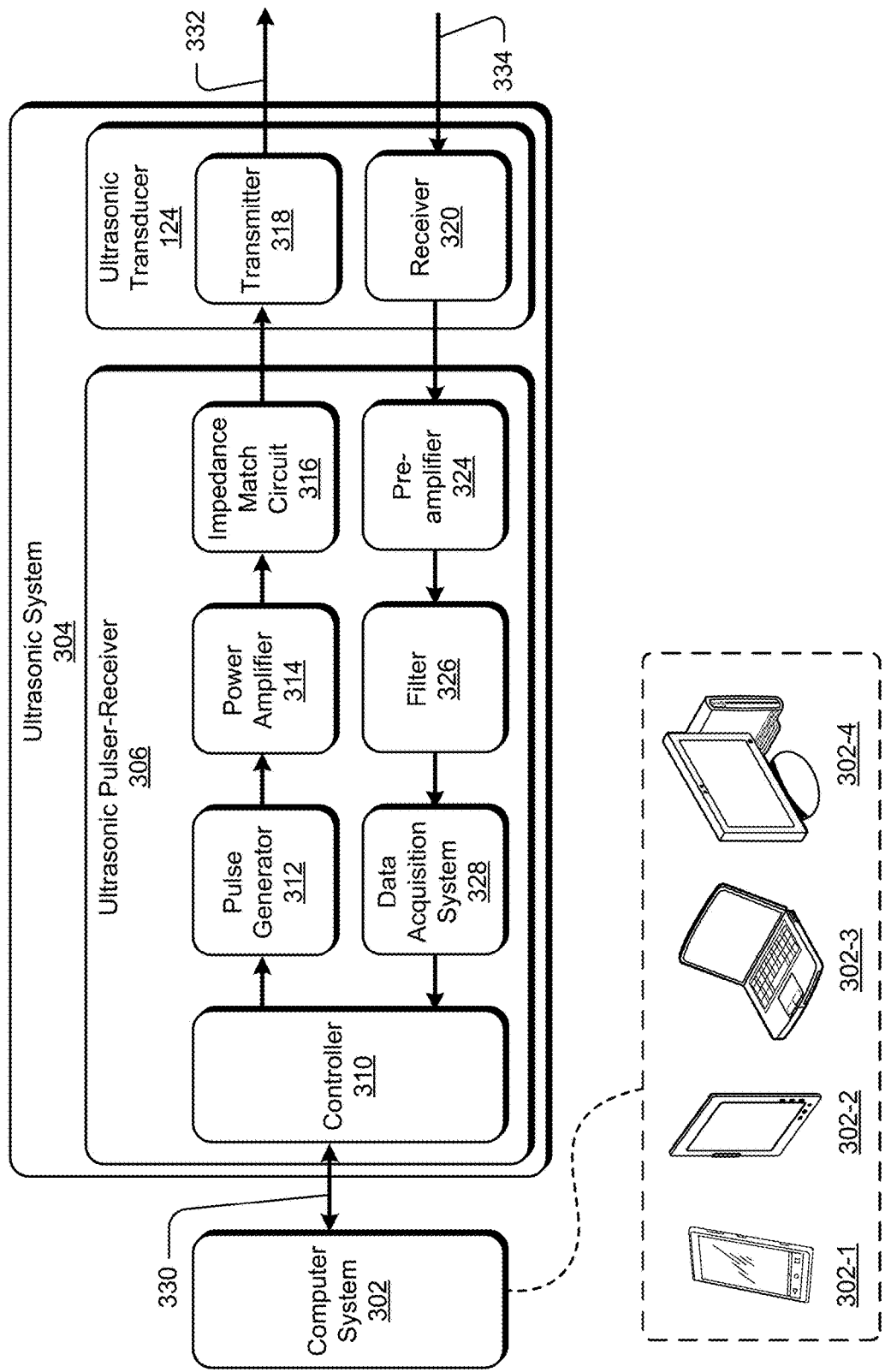
FIG. 3 is a schematic view illustrating an example computer system and an ultrasonic system of the described systems and techniques to monitor the SOC of a redox flow battery.

FIG. 3 illustrates an example computer system 302 and an ultrasonic system 304 of the described systems and techniques to monitor the SOC of a redox flow battery 100. The ultrasonic system 304 includes the ultrasonic transducer 124 and an ultrasonic pulser-receiver 306.

The ultrasonic transducer 124 includes a transmitter 318 and a receiver 320. The ultrasonic transducer 124 transmits pulses 332 into the probing cell 122 and receives echoes 334 that have propagated through the probing cell 122 to make acoustic measurements.

The ultrasonic pulser-receiver 306 can include a controller 310, a pulse generator 312, a power amplifier 314, an impedance match circuit 316, a preamplifier 324, a filter 326, and a data acquisition system 328. The ultrasonic system 304 can be implemented in a single device or as multiple separate devices. As an example, the transmitter 318 and the receiver 320 can be implemented as the ultrasonic transducer 124, including the V110-RM™ ultrasonic transducer manufactured by Olympus®. The controller 310, the pulse generator 312, the power amplifier 314, the impedance match circuit 316, the preamplifier 324, the filter 326, and the data acquisition system 328 can be implemented as an ultrasonic flaw detector, for example, the EPOCH 650™ manufactured by Olympus®.

The combination of the pulse generator 312, the power amplifier 314, and the impedance match circuit 316 generates high-voltage, electrical pulses to drive the transmitter 318. The pulses 332 from the transmitter 318 propagate through the catholyte solution within the housing 204 of the probing cell 122. Some of the pulses 332 are reflected to the receiver 320, transformed into an electrical signal, and processed by the data acquisition system 328.

The computer system 302 can be a variety of computing devices. As non-limiting examples, the computer system 302 can be a mobile phone 302-1, a tablet device 302-2, a laptop computer 302-3, or a desktop computer 302-4. The computer system 302 can be connected to the ultrasonic pulser-receiver 306 over a connection 330 via wired means, including a Universal Serial Bus (USB) connector, or wireless means, which can include communication over a wireless access network (WAN).

The computer system 302 includes one or more processors, a graphical user interface (GUI), and non-transitory computer-readable storage media (CRM). The one or more processors can be single-core processors or multiple-core processors. The GUI can be an interactive display that conveys information and represents actions taken by a system operator (e.g., an input to the computer system 302 made by the system operator through a mouse, a keyboard, or a touchscreen). For example, the GUI is used to control the ultrasonic pulser-receiver 306 and analyze the collected data.

The CRM can include any suitable memory or storage device, including random-access memory (RAM), static RAM (SRAM), dynamic RAM (DRAM), non-volatile RAM (NVRAM), read-only memory (ROM), or Flash memory. The CRM stores a suite of modules and computer-executable instructions that, when executed by the one or more processors, direct the computer system 302 to perform operations to monitor the SOC of the redox flow battery 100.

In operation, the controller 310, based on input provided by the computer system 302 over the connection 330, controls the pulse generator 312 to generate rectangular or sinusoidal pulses at a particular frequency and amplitude. The preamplifier 324 can amplify the rectangular or sinusoidal pulses output by the pulse generator 312. The impedance match circuit 316 can adjust the output impedance of the power amplifier 314 to maximize the power transfer of the pulses 332 to the transducer 124. The ultrasonic pulser-receiver 306 drives the ultrasonic transducer 124 to transmit the pulses 332 into the probing cell 122. For example, the ultrasonic transducer 124 can be driven with 100 V, 5 MHz square waves at a 10 Hz frequency to transmit the pulses 332 into the probing cell 122.

The echoes 334 are received by the ultrasonic transducer 124 and pulser-receiver 306. The echoes are amplified by the preamplifier 324 with, for example, 30 dB gain. The filter 326, which, for example, can be a 1.5-8.5 MHz bandpass filter, filters the echoes 334. The data acquisition system 328 converts the echoes 334 from analog waveforms into digital values for processing by the one or more processors of the computer system 302.

When the pulses 332 are transmitted into the disk 202, some of the pulses 332 are reflected to the ultrasonic transducer 124 at the catholyte-disk interface, while the rest of the pulses 332 propagate into the catholyte solution in the housing 204. At the catholyte-disk interface, some of the pulses 332 reflect multiple times within the disk 202 to which the ultrasonic transducer 124 is attached. These reflections, which do not propagate into the catholyte solution within the housing 204, are referred to as the first set of echoes. Echoes that make a single round trip through the catholyte solution in the housing 204 are referred to as the second set of echoes. The first set of echoes and the second set of echoes are used to calculate an acoustic attenuation coefficient of the catholyte solution in the probing cell 122.

Attenuation of Sound in Liquids

The following description provides theory and equations utilized by the one or more processors of the computer system 302, in aspects, to measure the acoustic attenuation coefficient of an electrolyte in the redox flow battery 100.

The speed of sound waves in liquids is given by Equation 4:

$$c = \sqrt{\left(\frac{\partial p}{\partial \rho}\right)_s}, \tag{4}$$

where p is the pressure and $\rho$ is the density of the liquid. The derivate $\partial p/\partial \rho$ is evaluated at constant entropy, which is denoted by s. Sound speed in liquids is dependent on the density of the liquid, which in turn is dependent on temperature, so the speed of sound in liquids also varies with temperature.

For the redox flow battery 100, the composition of the electrolyte solution changes, which relates to the SOC of the redox flow battery 100, as the chemical reactions proceed. Consequently, the density of electrolyte solution and the corresponding sound speed varies with SOC. Sound speed is usually measured by transmitting an ultrasonic pulse and measuring its time-of-flight, t, over a given distance, d, as shown in Equation 5:

$$c = \frac{d}{t}. \tag{5}$$

The acoustic attenuation coefficient, a, describes the energy loss rate of sound waves after propagation through a medium. Given a plane sound pressure wave with amplitude $A_0$, the amplitude decreases with traveling distance d following Equation 6:

$$A(d) = A_0 e^{-\alpha d}, \tag{6}$$

where A(d) is the amplitude of the pressure wave at distance d.

Several factors can attenuate sound in liquids. Some of the sound energy dissipates as heat when sound propagates through liquids due to the shear viscosity of the liquid. More sound energy is dissipated as heat at higher viscosity levels. As another example, scattering caused by inhomogeneity in the liquid, such as from gas bubbles, varying temperature, or varying density, can lead to energy loss in the direction of the pulse propagation. Also, at ultrasonic frequencies, the compressibility of the liquid can account for energy loss of the pulses 332. In addition, the molecular relaxation process can cause significant energy losses, which varies with the composition of the liquid. A good example of attenuation caused by molecular relaxation is the difference between pure water and seawater. At 20° C., the attenuation of sound at 20 kHz in distilled water is $10^{-5}$ Np/m, while attenuation at the same frequency in seawater is $2.53 \times 10^{-4}$ Np/m.

The composition of the electrolyte solution changes from the electrochemical reactions of the redox flow battery 100. For example, in the catholyte solution, the concentrations of $VO_2^+$ and $VO^{2+}$ ions vary as the charging and discharging cycles progress. Because the relaxation time of different molecules varies, the attenuation coefficient of the electrolyte solution varies with the variation of ion concentrations, and thus with the SOC. Measurement of the attenuation coefficient for the redox flow battery 100 is described in the following section.

Calculation of the Acoustic Attenuation Coefficient

When the ultrasonic transducer 124 transmits the pulses 332 into the disk 202, some of the pulses 332 are reflected to the ultrasonic transducer 124 as the echoes 334 at the disk-liquid interface. The remaining pulses propagate into the electrolyte liquid within the housing 204. The reflection coefficient, $R_{dl}$, describes the amplitude ratio of the echoes 334 to the pulses 332. The reflection coefficient is determined by the acoustic impedance of the disk 202 and the electrolyte liquid, as shown in Equation (7), $$R_{dl} = \frac{Z_d - Z_l}{Z_d + Z_l}, \quad (7)$$

where $Z_d = \rho_d c_d$ is the product of the density of and sound speed in the disk 202. In other words, $Z_d$ represents the acoustic impedance of the disk 202. The variable $Z_l = \rho_l c_l$ and represents the acoustic impedance of the electrolyte liquid. The transmission coefficient, $T_{dl}$, describes the amplitude ratio of the transmitted pulses 332 to incident pulses. The transmission coefficient is determined as shown in Equation (8):

$$T_{dl} = \frac{2Z_d}{Z_d + Z_l}. \quad (8)$$

Similar reflection and transmission occur at the liquid-disk interface, where the reflection coefficient $R_{ld}$ and the transmission coefficient $T_{ld}$ are:

$$R_{ld} = \frac{Z_l - Z_d}{Z_l + Z_d}, \quad (9)$$

$$T_{ld} = \frac{2Z_l}{Z_l + Z_d}. \quad (10)$$

The described systems and techniques assume that the pulses 332 transmitted into the disk 202 are a plane wave $Ae^{-i\omega t}$, with an amplitude denoted by A and an angular frequency denoted by $\omega$. At the disk-liquid interface, the pulses 332 reflect multiple times within the disk 202. These reflections, referred to as the first set of echoes, do not propagate into the electrolyte liquid within the housing 204. The first echo of the first set of echoes, which is denoted as $Pulse_{11}$ or $p_{11}$, has the following waveform:

$$p_{11}(t) = Ae^{-(i\omega t - 2kH)} R_{dl} e^{-2\alpha_d H}, \quad (11)$$

where $\alpha_d$ is the acoustic attenuation coefficient of the material of the disk 202 (e.g., glass), H is the height 212 of the disk 202, and k equals $\omega/c_d$ and is the wavenumber in the disk 202.

The second set of echoes include echoes that made a single round trip through the electrolyte in the housing 204. The first echo of the second set of echoes, which is denoted as $Pulse_{21}$ or $p_{21}$, has the following waveform:

$$p_{21}(t) = Ae^{-i(\omega t - 2k(H+L))} T_{dl} T_{ld} R_{ld} e^{-2\alpha_d H} e^{-2\alpha_l L}, \quad (12)$$

where L is the longitudinal length 214 of the housing 204 and $\alpha_l$ is the acoustic attenuation coefficient of the liquid.

The amplitude ratio of $p_{21}(t)$ to $p_{11}(t)$ is $$\frac{A_{21}}{A_{11}} = -T_{dl} T_{ld} e^{-2\alpha_l L}. \quad (13)$$

Transmission coefficients $T_{dl}$ and $T_{ld}$ can be calculated from the acoustic impedance of the disk 202 and the electrolyte liquid. By measuring the amplitude $A_{21}$ and $A_{11}$ at a given frequency, the acoustic attenuation coefficient at this frequency can be obtained.

The above calculations assume plane-wave propagation. In general, the pulses 332 emitted by the ultrasonic transducer 124 are not plane waves, but a beam of waves that spread with propagation distance. As a result, a correction term that accounts for beam-spreading loss is added to Equation (13), which yields Equation (14):

$$\frac{A_{21}}{A_{11}} = -T_{dl} T_{ld} e^{-2\alpha_l L} B_{corr}. \quad (14)$$

Attenuation due to beam spreading is determined by the frequency and diameter of the ultrasonic transducer 124 and the sound speed in the propagating medium. Ignoring the difference of $B_{corr}$ in different liquids (e.g., assuming that $B_{corr}$ is a constant for the ultrasonic transducer 124), the attenuation coefficient of electrolyte liquid can be calculated with reference to water, which has attenuation coefficients that are known at specific temperatures. Taking the logarithm of Equation (14) for both the electrolyte liquid and water gives:

$$\ln\left|\frac{A_{21}}{A_{11}}\right|_l = \ln|T_{dl} T_{ld}| - 2\alpha_l L + \ln B_{corr}, \quad (15)$$

and $$\ln\left|\frac{A_{21}}{A_{11}}\right|_w = \ln|T_{dw} T_{wd}| - 2\alpha_w L + \ln B_{corr}. \quad (16)$$

Subtracting the liquid measurement by the reference measurement in water yields $$\ln\left|\frac{A_{21}}{A_{11}}\right|_l - \ln\left|\frac{A_{21}}{A_{11}}\right|_w = \ln\left|\frac{T_{dl}T_{lg}}{T_{dw}T_{wd}}\right| - 2(\alpha_l - \alpha_w)L, \quad (17)$$

which, in turn, yields $$\alpha_l = \frac{1}{2L}\left(-\ln\left|\frac{A_{21}}{A_{11}}\right|_l + \ln\left|\left(\frac{A_{21}}{A_{11}}\right)\right|_w + \ln\left|\frac{T_{dl}T_{ld}}{T_{gd}T_{dg}}\right|\right) + \alpha_w, \quad (18)$$

where $\alpha_w = 25 \times 10^{-15}$ Np/(m·Hz$^2$) is the attenuation coefficient of water at 20° C.

Calibration of the Probing Cell

Calibration data, using the longitudinal length 214 of the housing 204, is obtained with a standard, including, as an example, water. At 20° C., the speed of sound in water is 1482.36 m/s. The time-of-flight of Pulse$_{11}$ and Pulse$_{21}$ can be obtained by cross-correlating the received echoes 334 with the transmitted pulses 332. The length of the housing 204 is $$L = c_w(t_{21} - t_{11}), \quad (19)$$

where $t_{21}$ and $t_{11}$ is the time of flight of Pulse$_{21}$ and Pulse$_{11}$, respectively.

In an example implementation, the height of each disk 202 (H=0.95 cm) was measured. With $t_{11}$, the speed of sound in the disk 202 can be calculated as $$c_d = \frac{2H}{t_{11}}. \quad (20)$$

In the example implementation, the disks 202 were made of borosilicate glass, which has a density of:

$$\rho_d = \frac{m}{H \cdot \pi\left(\frac{D}{2}\right)^2}, \quad (21)$$

where the measured mass of the disk 202, m, was 15.13 g, and the diameter 210, D, of the disk 202 was 1.50 cm.

With the above parameters and Equation (16), the calibration measurement using water can be calculated.

Example SOC Determinations

Figure 4:
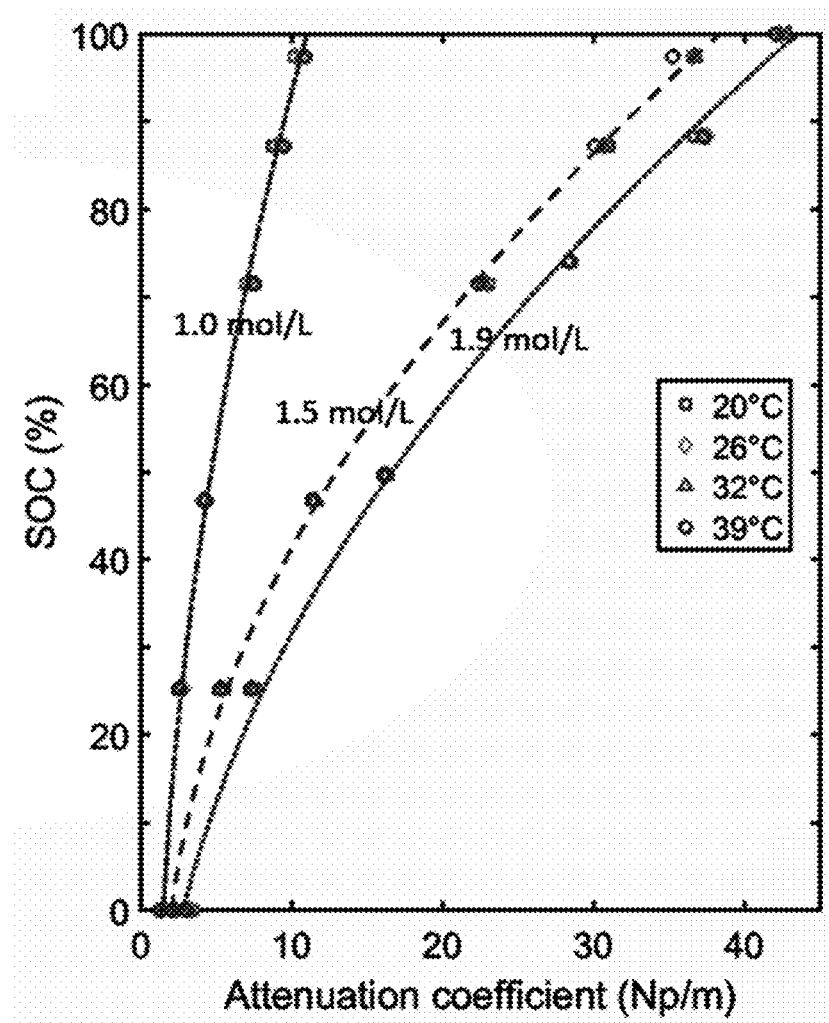
FIG. 4 illustrates example measurements of the SOC of a redox flow battery as a function of an acoustic attenuation coefficient.

FIG. 4 illustrates determined SOC values of the redox flow battery 100 as a function of the acoustic attenuation coefficient. In the depicted example, the acoustic attenuation coefficient is measured with the ultrasonic transducer 124 transmitting the pulses 332 at a frequency of 5 MHz and with the concentrations of vanadium in the catholyte solution being 1.0, 1.5, and 1.9 mol/L, respectively.

The relationship between the acoustic attenuation coefficient and the SOC of the redox flow battery 100 can be established through benchmark tests using electrolyte solutions at known SOCs. Catholytes with a SOC of 0%, 25%, 50%, 75%, 90%, and 100% were prepared by mixing the V$^{4+}$ and the V$^{5+}$ electrolyte solutions. The vanadium electrolytes with different SOCs were placed into the probing cell 122 with the ultrasonic transducer 124 attached to one of the disks 202. The acoustic measurement data were collected ten times for each catholyte solution and for each of four different temperatures: 20° C., 26° C., 32° C., and 39° C. The measurements for each catholyte solution at each temperature were taken while the pump 116 was not operating. From these tests, the data points in FIG. 4 were obtained.

Relationships between the acoustic attenuation coefficients and the SOC of the redox flow battery 100 at four temperatures and three vanadium ion concentrations are shown in FIG. 4. At each concentration, the acoustic attenuation coefficient increases as the SOC increases. For example, the attenuation coefficient in 1.5 mol/L vanadium electrolyte solution at 20° C. is 2.57 Np/m when the SOC is 0% and increases to 36.62 Np/m when the SOC is 100%. The variation of attenuation coefficient as temperature changes is negligibly small, indicating that the attenuation coefficient at 5 MHz is insensitive to temperature in the tested range of 20 to 39° C. The relationship between the SOC and the acoustic attenuation coefficient can be fitted with polynomial models at each temperature and vanadium ion concentration. An example of the relationship between the SOC and the mean acoustic attenuation coefficient, along with coefficients of determination (R2), is provided in Table 1 below.

TABLE 1

| Vanadium concentration | Model | R$^2$ |
|---|---|---|
| 1.0 mol/L | SOC = $\sqrt{0.1567 \times \alpha}\sqrt{-0.1784} - 0.2454$ | 0.9976 |
| 1.5 mol/L | SOC = $\sqrt{0.0345 \times \alpha}\sqrt{-0.0550} - 0.1261$ | 0.9982 |
| 1.9 mol/L | SOC = $\sqrt{0.0384 \times \alpha}\sqrt{-0.0295} - 0.2802$ | 0.9955 |

The low sensitivity of the acoustic attenuation coefficient to temperature makes it a robust parameter for use in field applications where the temperature variation range is approximately 20 to 40° C. In other words, the fluctuation in temperature that can result from varying operational conditions, such as the flow rate of the catholyte solution, during a practical application would have a minor effect on the measured SOC.

The relationship between the acoustic attenuation coefficient and the SOC of the redox flow battery 100 was also established through in operando tests during a charge-discharge cycle. Ten measurements for the catholyte solution were taken at 30-minute intervals during the charge-discharge cycle while the pump 116 was operating. The in operando tests results were compared to quasi in operando test results. Consistency between in operando test results and quasi in operando test results indicated that the SOC measurement is generally insensitive to varying flow speeds of the redox flow battery 100.

It should be noted that the acoustic attenuation coefficient can be dependent on the frequency of sound waves. At 5 MHz, the echoes 334 that reflected within the disk 202 are well separated from each other. Similarly, the echoes 334 that propagated through the catholyte solution within the housing 204 are well separated, even at the highest SOC where attenuation is the strongest.

Example Method

Figure 5:
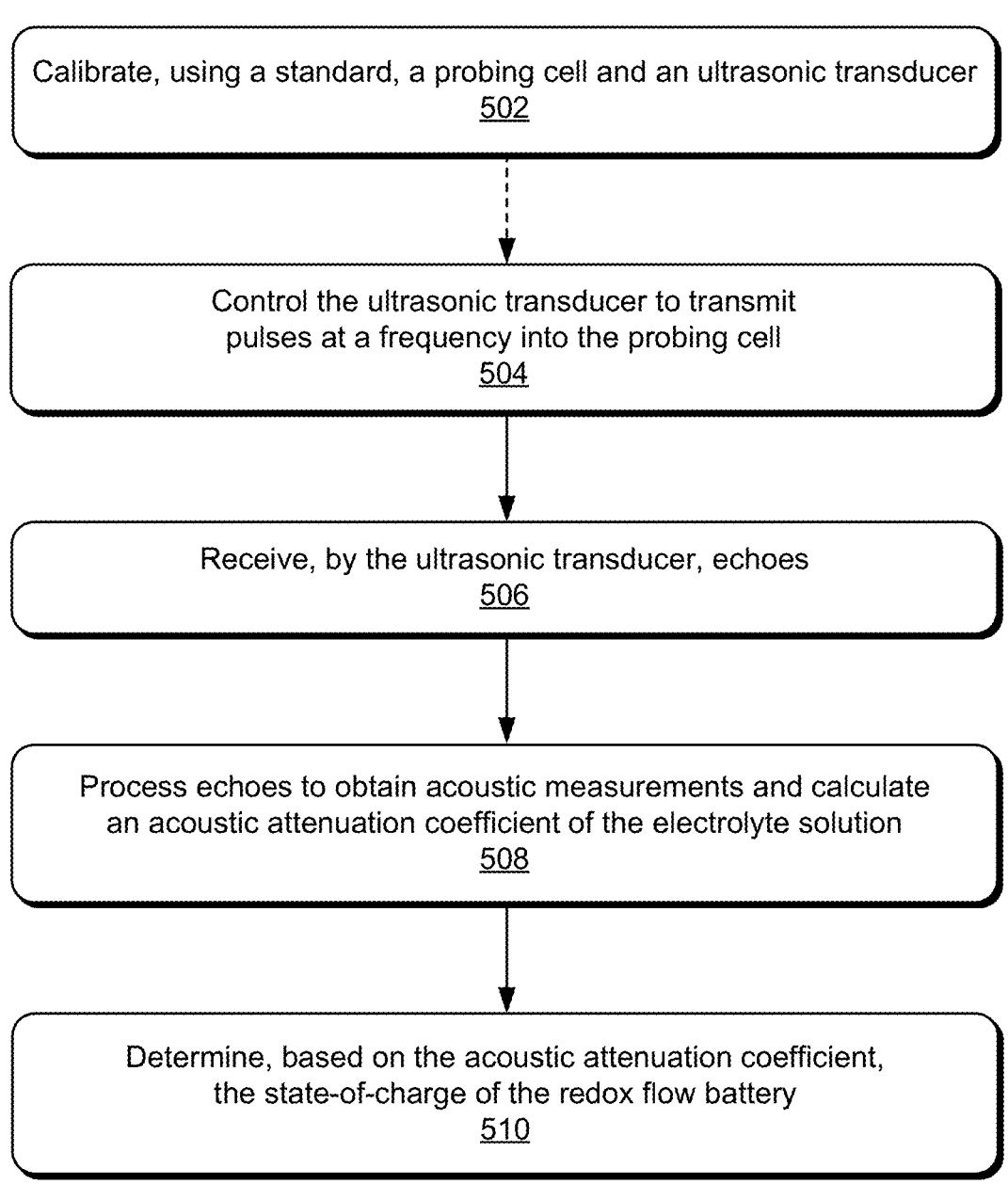
FIG. 5 illustrates an example in operando, non-invasive method to monitor the SOC in accordance with one or more aspects of the described systems and techniques.

FIG. 5 illustrates an example in operando, non-invasive method 500 to monitor the SOC of a redox flow battery 100 in accordance with one or more aspects of the described systems and techniques. The series of operational blocks 502-510 that describe the method are not to be construed as a limitation, as one or more of the described operational blocks 502-510 can be combined using different elements or ordering to implement the method 500 or an alternate, derivative method. Furthermore, although described in the context of being performed by or via the computer system 302 of FIG. 3, portions of the method 500 may be divided or allocated across multiple computer systems. The method 500 may use elements of FIGS. 1-3.

At 502, a probing cell and an ultrasonic transducer are calibrated using a standard. For example, the probing cell 122 and the ultrasonic transducer 124 are calibrated using water. The calibration allows the computer system 302 or another computer system to measure an intrinsic frequency response of the probing cell. The calibration measurements made in water are a background reference in subsequent calculations by the computer system 302. In some instances, the probing cell and ultrasonic transducer have previously been calibrated using water or some other liquid. In those instances, the method 500 need not include operation 502.

At 504, the ultrasonic transducer is controlled to transmit pulses at a frequency into the probing cell. The ultrasonic transducer is attached to the probing cell, which is connected to an electrolyte reservoir of the redox flow battery containing an electrolyte solution. For example, the probing cell 122 and the ultrasonic transducer 124 are incorporated into the redox flow battery 100 to measure the response from the electrolyte solution (e.g., the catholyte solution). The ultrasonic transducer 124 is attached to the probing cell 122, which is connected to an electrolyte reservoir (e.g., the catholyte reservoir 120) containing the electrolyte solution. The ultrasonic transducer 124 is controlled to transmit the pulses 332 at a frequency into the probing cell 122.

At 506, echoes are received by the ultrasonic transducer. The echoes are reflections of the pulses. For example, the ultrasonic transducer 124 receives the echoes 334, which are reflections of the pulses 332.

At 508, echoes are processed to obtain acoustic measurements. The acoustic measurements are effective to calculate an acoustic attenuation coefficient of the electrolyte solution. For example, the computer system 302 processes the echoes 334 received by the ultrasonic transducer 124 to obtain acoustic measurements. The acoustic measurements are effective to calculate an acoustic attenuation coefficient of the electrolyte solution.

At 510, the SOC of the redox flow battery is determined based on the acoustic attenuation coefficient. The acoustic attenuation coefficient represents an energy loss rate of the echoes after propagation through the probing cell. For example, the computer system 302 determines, based on the acoustic attenuation coefficient, the SOC of the redox flow battery 100. The acoustic attenuation coefficient represents an energy loss rate of the echoes 334 after propagation through the probing cell 122.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

What is claimed is:

1. A system for monitoring a state-of-charge of a redox flow battery having an electrolyte reservoir containing an electrolyte solution, the system comprising:
   a probing cell, the probing cell connected to the electrolyte reservoir;
   an ultrasonic system, comprising:
      an ultrasonic pulser-receiver; and
      an ultrasonic transducer attached to the probing cell, the ultrasonic transducer configured to:
         transmit pulses at a frequency into the probing cell; and
         receive echoes, the echoes being reflections of the pulses; and
   one or more processors of a computer system, the one or more processors configured to:
      process the echoes to obtain acoustic measurements, the acoustic measurements effective to calculate an acoustic attenuation coefficient of the electrolyte solution; and
      determine, based on the acoustic attenuation coefficient, the state-of-charge of the redox flow battery, the acoustic attenuation coefficient representing an energy loss rate of the echoes after propagation through the probing cell,
   wherein the probing cell and the ultrasonic system are configured to be calibrated using water.

2. The system of claim 1, wherein the probing cell is configured to be temporarily connected to the electrolyte reservoir.

3. The system of claim 1, wherein the probing cell comprises a housing having a cylindrical shape and a first lateral end and a second lateral end, wherein the probing cell further comprises a first disk at the first lateral end and a second disk at the second lateral end, and wherein the ultrasonic transducer is attached to one of the first disk or the second disk.

4. The system of claim 3, wherein the housing has a longitudinal length and a first diameter, the longitudinal length effective, based on the frequency of the pulses, to separate the echoes that propagate through the housing.

5. The system of claim 4, wherein the first disk and the second disk have a second diameter and a height, the height effective, based on the frequency of the pulses, to separate the echoes that propagate through the disk to which the ultrasonic transducer is attached.

6. The system of claim 5, wherein:
   the echoes comprise a first set of echoes and a second set of echoes, the first set of echoes comprising reflections of the pulses that reflected within the disk to which the ultrasonic transducer is attached, the second set of echoes comprising reflection of the pulses that reflected through the electrolyte solution in the housing; and
   the one or more processors further configured to:
      determine a first amplitude of a first echo of the first set of echoes;
      determine a second amplitude of a first echo of the second set of echoes; and
      calculate, based on the longitudinal length of the housing and a ratio of the second amplitude to the first amplitude at a particular frequency, the acoustic attenuation coefficient.

7. The system of claim 1, wherein the ultrasonic pulser-receiver is further configured to perform one or more of:
   amplify the echoes; or
   filter the echoes.

8. The system of claim 1, wherein the ultrasonic pulser-receiver is further configured, in the transmission of the pulses into the probing cell, to:
   generate a series of pulses;
   amplify the series of pulses; and
   impedance match the series of pulses to the probing cell.

9. The system of claim 1, wherein the electrolyte reservoir is a catholyte reservoir of the redox flow battery.

10. The system of claim 1, wherein the one or more processors are further configured to obtain at least ten acoustic measurements, wherein the at least ten acoustic measurements are taken while a pump of the redox flow battery is on, the pump being connected to the probing cell and the electrolyte reservoir.

11. A method for monitoring a state-of-charge of a redox flow battery having an electrolyte reservoir containing an electrolyte solution, the method comprising:
transmitting, by an ultrasonic transducer attached to a probing cell, pulses at a frequency into the probing cell, the probing cell connected to the electrolyte reservoir;
receiving, by the ultrasonic transducer, echoes, the echoes being reflections of the pulses;
processing, by one or more processors of a computer system, the echoes to obtain acoustic measurements, the acoustic measurements effective to calculate an acoustic attenuation coefficient of the electrolyte solution;
determining, by the one or more processors and based on the acoustic attenuation coefficient, the state-of-charge of the redox flow battery, the acoustic attenuation coefficient representing an energy loss rate of the echoes after propagation through the probing cell; and
calibrating, using water, the probing cell and the ultrasonic transducer.

12. The method of claim 11, wherein the probing cell comprises a housing having a cylindrical shape and a first lateral end and a second lateral end, wherein the probing cell further comprises a first disk at the first lateral end and a second disk at the second lateral end, and wherein the ultrasonic transducer is attached to one of the first disk or the second disk.

13. The method of claim 12, wherein the housing has a longitudinal length and a first diameter, the longitudinal length effective, based on the frequency of the pulses, to separate the echoes that propagate through the housing.

14. The method of claim 13, wherein the first disk and the second disk have a second diameter and a height, the height effective, based on the frequency of the pulses, to separate the echoes that propagate through the disk to which the ultrasonic transducer is attached.

15. The method of claim 14, wherein:
the echoes comprise a first set of echoes and a second set of echoes, the first set of echoes comprising reflections of the pulses that reflected within the disk to which the ultrasonic transducer is attached, the second set of echoes comprising reflection of the pulses that reflected through the electrolyte solution in the housing; and
the method further comprising:
determining, by the one or more processors, a first amplitude of a first echo of the first set of echoes;
determining, by the one or more processors, a second amplitude of a first echo of the second set of echoes; and
calculating, by the one or more processors and based on the longitudinal length of the housing and a ratio of the second amplitude to the first amplitude at a particular frequency, the acoustic attenuation coefficient.

16. The method of claim 11, further comprising obtaining, by the one or more processors, at least ten acoustic measurements, wherein the at least ten acoustic measurements are taken while a pump of the redox flow battery is on, the pump being connected to the probing cell and the electrolyte reservoir.

17. A computer-readable storage media comprising computer-executable instructions for monitoring a state-of-charge of a redox flow battery having an electrolyte reservoir containing an electrolyte solution, the computer-executable instructions, when executed, cause one or more processors of a computer system to:
control an ultrasonic transducer to transmit pulses at a frequency into a probing cell, wherein the ultrasonic transducer is attached to the probing cell and the probing cell is connected to the electrolyte reservoir;
receive, from the ultrasonic transducer, echoes, the echoes being reflections of the pulses, the echoes comprising a first set of echoes and a second set of echoes;
process echoes to obtain acoustic measurements, the acoustic measurements effective to calculate an acoustic attenuation coefficient of the electrolyte solution;
determine, based on the acoustic attenuation coefficient, the state-of-charge of the redox flow battery, the acoustic attenuation coefficient representing an energy loss rate of the echoes after propagation through the probing cell;
determine a first amplitude of a first echo of the first set of echoes;
determine a second amplitude of a first echo of the second set of echoes; and
calculate, based on a longitudinal length of the probing cell and a ratio of the second amplitude to the first amplitude at a particular frequency, the acoustic attenuation coefficient,
wherein the echoes comprise a first set of echoes and a second set of echoes,
wherein the first set of echoes comprise reflections of the pulses that reflected within a disk of the probing cell to which the ultrasonic transducer is attached, and
wherein the second set of echoes comprise reflection of the pulses that reflected through the electrolyte solution in the probing cell.

18. A system for monitoring a state-of-charge of a redox flow battery having an electrolyte reservoir containing an electrolyte solution, the system comprising:
a probing cell, the probing cell connected to the electrolyte reservoir;
an ultrasonic system, comprising:
an ultrasonic pulser-receiver; and
an ultrasonic transducer attached to the probing cell, the ultrasonic transducer configured to:
transmit pulses at a frequency into the probing cell; and
receive echoes, the echoes being reflections of the pulses; and
one or more processors of a computer system, the one or more processors configured to:
process the echoes to obtain acoustic measurements, the acoustic measurements effective to calculate an acoustic attenuation coefficient of the electrolyte solution; and
determine, based on the acoustic attenuation coefficient, the state-of-charge of the redox flow battery, the acoustic attenuation coefficient representing an energy loss rate of the echoes after propagation through the probing cell,
wherein the probing cell comprises a housing having a cylindrical shape and a first lateral end and a second lateral end,
wherein the probing cell further comprises a first disk at the first lateral end and a second disk at the second lateral end, and
wherein the ultrasonic transducer is attached to one of the first disk or the second disk.

19. The system of claim 18, wherein the housing has a longitudinal length and a first diameter, the longitudinal length effective, based on the frequency of the pulses, to separate the echoes that propagate through the housing.

20. The system of claim 19, wherein the first disk and the second disk have a second diameter and a height, the height effective, based on the frequency of the pulses, to separate the echoes that propagate through the disk to which the ultrasonic transducer is attached.

21. The system of claim 20, wherein:
the echoes comprise a first set of echoes and a second set of echoes, the first set of echoes comprising reflections of the pulses that reflected within the disk to which the ultrasonic transducer is attached, the second set of echoes comprising reflection of the pulses that reflected through the electrolyte solution in the housing; and
the one or more processors further configured to:
determine a first amplitude of a first echo of the first set of echoes;
determine a second amplitude of a first echo of the second set of echoes; and
calculate, based on the longitudinal length of the housing and a ratio of the second amplitude to the first amplitude at a particular frequency, the acoustic attenuation coefficient.

22. A method for monitoring a state-of-charge of a redox flow battery having an electrolyte reservoir containing an electrolyte solution, the method comprising:
transmitting, by an ultrasonic transducer attached to a probing cell, pulses at a frequency into the probing cell, the probing cell connected to the electrolyte reservoir;
receiving, by the ultrasonic transducer, echoes, the echoes being reflections of the pulses;
processing, by one or more processors of a computer system, the echoes to obtain acoustic measurements, the acoustic measurements effective to calculate an acoustic attenuation coefficient of the electrolyte solution; and
determining, by the one or more processors and based on the acoustic attenuation coefficient, the state-of-charge of the redox flow battery, the acoustic attenuation coefficient representing an energy loss rate of the echoes after propagation through the probing cell,
wherein the probing cell comprises a housing having a cylindrical shape and a first lateral end and a second lateral end,
wherein the probing cell further comprises a first disk at the first lateral end and a second disk at the second lateral end, and
wherein the ultrasonic transducer is attached to one of the first disk or the second disk.

23. The method of claim 22, wherein the housing has a longitudinal length and a first diameter, the longitudinal length effective, based on the frequency of the pulses, to separate the echoes that propagate through the housing.

24. The method of claim 23, wherein the first disk and the second disk have a second diameter and a height, the height effective, based on the frequency of the pulses, to separate the echoes that propagate through the disk to which the ultrasonic transducer is attached.

25. The method of claim 24, wherein:
the echoes comprise a first set of echoes and a second set of echoes, the first set of echoes comprising reflections of the pulses that reflected within the disk to which the ultrasonic transducer is attached, the second set of echoes comprising reflection of the pulses that reflected through the electrolyte solution in the housing; and
the method further comprising:
determining, by the one or more processors, a first amplitude of a first echo of the first set of echoes;
determining, by the one or more processors, a second amplitude of a first echo of the second set of echoes; and
calculating, by the one or more processors and based on the longitudinal length of the housing and a ratio of the second amplitude to the first amplitude at a particular frequency, the acoustic attenuation coefficient.

* * * * *